(12) United States Patent
Forster et al.

(10) Patent No.: US 11,308,379 B2
(45) Date of Patent: Apr. 19, 2022

(54) RFID TAGS WITH SHIELDING STRUCTURE FOR INCORPORATION INTO MICROWAVABLE FOOD PACKAGING

(71) Applicant: Avery Dennison Retail Information Services, LLC, Mentor, OH (US)

(72) Inventors: Ian J. Forster, Chelmsford (GB); Norman Howard, Ilford (GB); Brad Cumby, Liberty Township, OH (US); James Orlowski, Painesville, OH (US); Brian Strohmeier, Pittsburgh, PA (US); Hu Duan, Solon, OH (US); Cameron Higgins, Franklin, OH (US); John Feltz, Fairborn, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 15/856,502

(22) Filed: Dec. 28, 2017

(65) Prior Publication Data

US 2018/0189623 A1    Jul. 5, 2018

Related U.S. Application Data

(60) Provisional application No. 62/440,108, filed on Dec. 29, 2016, provisional application No. 62/539,817, filed on Aug. 1, 2017.

(51) Int. Cl.
*G06K 19/06* (2006.01)
*G06K 19/077* (2006.01)
(Continued)

(52) U.S. Cl.
CPC ..... *G06K 19/0773* (2013.01); *B65D 81/3446* (2013.01); *B65D 81/3453* (2013.01);
(Continued)

(58) Field of Classification Search
CPC .. G06Q 20/223; G06Q 30/0207; G06Q 20/10; G06Q 20/401; H04L 67/104
(Continued)

(56) References Cited

U.S. PATENT DOCUMENTS

D383,465 S       9/1997   Chen
6,142,381 A  *  11/2000   Finn ................. G06K 19/07743
                                                              235/441
(Continued)

FOREIGN PATENT DOCUMENTS

CN       102119395       7/2011
CN       104541316       4/2015
(Continued)

OTHER PUBLICATIONS

International Search Report and Written Opinion dated Jun. 8, 2018 issued in corresponding IA No. PCT/US2017/068659 filed Dec. 28, 2017.
(Continued)

*Primary Examiner* — Jamara A Franklin

(57) ABSTRACT

RFID tags are provided for incorporation into the packaging of a microwavable food item, with the RFID tag being configured to be safely microwaved. The RFID tag includes an antenna defining a gap and configured to operate at a first frequency. An RFID chip is electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. The shielding structure is configured to limit the voltage across the gap when the antenna is exposed to a second frequency that is greater than first frequency. In additional embodiments, RFID tags are provided for incorporation into the packaging of a microwavable food item, with the RFID tag being configured to be
(Continued)

safely microwaved. The RFID tag includes an RFID chip and an antenna electrically coupled to the RFID chip. The antenna may have a sheet resistance in the range of approximately 100 ohms to approximately 230 ohms, optionally with an optical density in the range of approximately 0.18 to approximately 0.29. Alternatively, or additionally, the antenna may be configured to fracture into multiple pieces upon being subjected to heating in a microwave oven. Alternatively, or additionally, the RFID tag may be incorporated in an RFID label that is secured to the package by a joinder material with a greater resistance than that of the antenna, such as a sheet resistance in the range of approximately 100 ohms to approximately 230 ohms.

14 Claims, 5 Drawing Sheets

(51) Int. Cl.
*G06K 19/07* (2006.01)
*B65D 81/34* (2006.01)
(52) U.S. Cl.
CPC ..... *G06K 19/0715* (2013.01); *G06K 19/0723* (2013.01); *G06K 19/07752* (2013.01); *G06K 19/07771* (2013.01); *G06K 19/07775* (2013.01); *G06K 19/07786* (2013.01); *G06K 19/07798* (2013.01); *B65D 2203/10* (2013.01)
(58) Field of Classification Search
USPC ....................................................... 235/492
See application file for complete search history.

(56) References Cited

U.S. PATENT DOCUMENTS

| | | | |
|---|---|---|---|
| 7,214,569 | B2 | 5/2007 | Swindlehurst et al. |
| D546,819 | S | 7/2007 | Oliver |
| D553,124 | S | 10/2007 | Joughin et al. |
| 7,471,173 | B2 | 12/2008 | Hidaka et al. |
| 7,500,610 | B1 | 3/2009 | Hadley et al. |
| 7,535,366 | B2 | 5/2009 | Egbert et al. |
| D634,738 | S | 3/2011 | Lim et al. |
| 8,289,165 | B2 | 10/2012 | Forster |
| 8,473,235 | B2 | 6/2013 | Kittel et al. |
| 8,511,569 | B1 | 8/2013 | Koepp et al. |
| D697,900 | S | 1/2014 | Yang et al. |
| D716,774 | S | 11/2014 | Forster et al. |
| 9,070,563 | B2 | 6/2015 | Yamazaki et al. |
| 9,378,451 | B2 | 6/2016 | Forster |
| 9,418,262 | B1 | 8/2016 | Gentile et al. |
| 9,595,211 | B2 | 3/2017 | Lim et al. |
| D809,489 | S | 2/2018 | Burkholder et al. |
| D812,045 | S | 3/2018 | Howard |
| D826,220 | S | 8/2018 | He |
| D837,769 | S | 1/2019 | Yang |
| 10,186,765 | B2 | 1/2019 | Coleman et al. |
| 10,243,255 | B2 | 3/2019 | Rokhsaz et al. |
| 10,268,945 | B1 | 4/2019 | Keller et al. |
| 10,311,355 | B1 | 6/2019 | Hahn et al. |
| D855,039 | S | 7/2019 | Naweed |
| D880,460 | S | 4/2020 | Forster |
| 2002/0157411 | A1 | 10/2002 | Ishikawa et al. |
| 2004/0089707 | A1 | 5/2004 | de Cortina et al. |
| 2005/0001785 | A1 | 1/2005 | Ferguson et al. |
| 2005/0091996 | A1 | 5/2005 | Ishikawa et al. |
| 2006/0043198 | A1 | 3/2006 | Forster |
| 2006/0044192 | A1 | 3/2006 | Egbert |
| 2006/0054710 | A1 | 3/2006 | Forster et al. |
| 2006/0145872 | A1 | 7/2006 | Tanaka et al. |
| 2007/0063057 | A1 | 3/2007 | Masubuchi et al. |
| 2007/0069859 | A1 | 3/2007 | Bae et al. |
| 2007/0132593 | A1 | 6/2007 | Yamazaki |
| 2007/0171129 | A1 | 7/2007 | Coleman et al. |
| 2007/0194935 | A1 | 8/2007 | Ayala et al. |
| 2007/0238245 | A1 | 10/2007 | Cote et al. |
| 2008/0105673 | A1 | 5/2008 | Ikeda et al. |
| 2008/0122631 | A1 | 5/2008 | Kodukula et al. |
| 2008/0143480 | A1 | 6/2008 | Egbert et al. |
| 2008/0220721 | A1 | 9/2008 | Downie et al. |
| 2009/0109002 | A1 | 4/2009 | Hadley et al. |
| 2009/0179817 | A1 | 7/2009 | Yin |
| 2009/0236334 | A1 | 9/2009 | Ben-Shmuel et al. |
| 2009/0309703 | A1* | 12/2009 | Forster ..................... H01Q 7/04 340/10.1 |
| 2010/0000980 | A1 | 1/2010 | Popescu |
| 2010/0117819 | A1 | 5/2010 | Murray |
| 2010/0141452 | A1 | 6/2010 | Lian et al. |
| 2010/0213187 | A1 | 8/2010 | Bandholz et al. |
| 2011/0133904 | A1 | 6/2011 | Warther |
| 2011/0147467 | A1 | 6/2011 | Choi |
| 2012/0061473 | A1 | 3/2012 | Forster et al. |
| 2012/0062367 | A1 | 3/2012 | Warther |
| 2012/0111950 | A1 | 5/2012 | Worrall et al. |
| 2013/0002404 | A1 | 1/2013 | Takeoka et al. |
| 2013/0087625 | A1 | 4/2013 | Kato |
| 2013/0306626 | A1 | 11/2013 | Torres et al. |
| 2013/0313328 | A1 | 11/2013 | Mohajer-Iravani et al. |
| 2014/0034739 | A1 | 2/2014 | Forster et al. |
| 2015/0076238 | A1 | 3/2015 | Koskelainen |
| 2015/0144702 | A1 | 5/2015 | Mei et al. |
| 2016/0003895 | A1 | 1/2016 | Farr et al. |
| 2017/0214142 | A1 | 8/2017 | Rokhsaz et al. |
| 2018/0092486 | A1 | 4/2018 | Kwon et al. |
| 2018/0189623 | A1 | 7/2018 | Forster et al. |
| 2019/0325282 | A1 | 10/2019 | Forster et al. |
| 2020/0005110 | A1 | 1/2020 | Forster |
| 2020/0160005 | A1 | 5/2020 | Volpi et al. |

FOREIGN PATENT DOCUMENTS

| | | |
|---|---|---|
| CN | 109389203 | 2/2019 |
| EP | 1174667 | 1/2002 |
| EP | 1479619 | 11/2004 |
| EP | 2306588 | 4/2011 |
| GB | 2554952 | 4/2018 |
| JP | 2001-317741 | 11/2001 |
| JP | 2002-150248 | 5/2002 |
| JP | 2003-087044 | 3/2003 |
| JP | 2005-252853 | 9/2005 |
| JP | 2006-132793 | 5/2006 |
| JP | 2007-086863 | 4/2007 |
| JP | 2007-089054 | 4/2007 |
| JP | 2010-045467 | 2/2010 |
| JP | 2011-227668 | 11/2011 |
| JP | 2016-532901 | 10/2016 |
| WO | 2002/099764 | 12/2002 |
| WO | 2006/048964 | 11/2006 |
| WO | 2008/084917 | 7/2008 |
| WO | 2011/159716 | 12/2011 |
| WO | 2014/210000 | 12/2014 |
| WO | 2017/094794 | 6/2017 |
| WO | 2018/125977 | 7/2018 |

OTHER PUBLICATIONS

International Preliminary Report on Patentability dated Jul. 11, 2019 issued in corresponding IA No. PCT/US2017/068659 filed Dec. 28, 2017.
International Search Report and Written Opinion dated Oct. 1, 2019 issued in corresponding IA No. PCT/US2019/039485 filed Jun. 27, 2019.
International Preliminary Report on Patentability dated Oct. 20, 2020 issued in corresponding IA No. PCT/US2019/028281 filed Apr. 19, 2019.
International Search Report and Written Opinion dated Aug. 5, 2019 issued in corresponding IA No. PCT/US2019/028281 filed Apr. 19, 2019.

(56) References Cited

OTHER PUBLICATIONS

International Search Report and Written Opinion dated Oct. 11, 2019 issued in corresponding IA No. PCT/US2019/039460 filed Jun. 27, 2019.
International Preliminary Report on Patentability dated Oct. 29, 2020 issued in corresponding IA No. PCT/US2019/028275 filed Apr. 19, 2019.
International Search Report and Written Opinion dated Jul. 12, 2019 issued in corresponding IA No. PCT/US2019/028275 filed Apr. 19, 2019.
International Search Report and Written Opinion dated Sep. 10, 2019 issued in corresponding IA No. PCT/US2019/028268 filed Apr. 19, 2019.
International Preliminary Report on Patentability dated Oct. 29, 2020 issued in corresponding IA No. PCT/US2019/028268 filed Apr. 19, 2019.
International Search Report and Written Opinion dated Mar. 31, 2021 issued in corresponding IA No. PCT/US2020/067168 filed Dec. 28, 2020.
International Search Report and Written Opinion dated Mar. 30, 2021 issued in corresponding IA No. PCT/US2020/067115 filed Dec. 28, 2020.
International Preliminary Report on Patentability dated Dec. 29, 2020 issued in corresponding IA No. PCT/US2019/039485 filed Jun. 27, 2019.
International Preliminary Report on Patentability dated Dec. 29, 2020 issued in corresponding IA No. PCT/US2019/039460 filed Jun. 27, 2019.

\* cited by examiner

RFID TAGS WITH SHIELDING STRUCTURE FOR INCORPORATION INTO MICROWAVABLE FOOD PACKAGING

CROSS REFERENCE TO RELATED APPLICATION(S)

The present application claims priority to and the benefit of U.S. Provisional Patent Application No. 62/440,108 filed Dec. 29, 2016 and U.S. Provisional Patent Application No. 62/539,817 filed Aug. 1, 2017, each of which is incorporated herein by reference in its entirety.

BACKGROUND

Field of the Disclosure

The present subject matter relates to packaging for microwavable food items. More particularly, the present subject matter relates to radio frequency identification ("RFID") tags incorporated into packaging for microwavable food items.

Description of Related Art

It is known for packages for microwavable food items to include cooking aids that are to be placed into the microwave oven with the food item for cooking/heating the food item. For example, foods having crusts, such as frozen pies or stuffed bread, may benefit from "crisping sleeves," which are paper items that at least partially surround the food item during microwaving. Typically, a "crisping sleeve" has a paper substrate, with a susceptor incorporated into the inner surface of the "crisping sleeve," facing and preferably in contact with the food item. The susceptor, which may be a metallized film, absorbs microwave energy and converts it into heat, which crisps and/or browns the crust or surface of the food item, thus improving the look and texture of the food item. Due to the absorbing nature of the film used as the susceptor, relatively low levels of energy are reflected by it, such that it does not strike an arc due to generating high differential voltages between adjacent parts of the film, which could otherwise cause the packaging to catch fire.

It is also known to incorporate RFID technology, such as an RFID tag, into product packaging for various purposes, including inventory management and theft prevention. FIG. 1 shows an RFID tag T according to conventional design, which may be secured to or otherwise associated with an enclosure like that of enclosure 13 of FIG. 1A (typically, a paper or cardboard sleeve or box) of the package 9 for a microwavable food item in respect to FIG. 1A. The entirety of the packaging 9 of FIG. 1A is not intended to be microwaved, but rather the food item (and, optionally, a "crisping sleeve" or the like) is removed from the enclosure 13 of FIG. 1A and inserted into the microwave oven for heating/cooking.

The RFID tag T of FIG. 1 includes an RFID chip C, with an associated dipole antenna A for transmitting information to and/or receiving information from an RFID reader (not illustrated). The RFID chip C is electrically coupled to the antenna A across a gap G defined by the antenna A between two conductor pad areas P.

RFID tags inherently must, at some point, have a gap across which the RFID chip is placed that has a voltage at the intended frequency of operation when in the field of a reader device. The power required incident on the RFID chip C may be as low as 10 microwatts, whereas a microwave oven may typically operate at a power level in excess of 800 watts, which can generate very high voltages across the gap G and the associated RFID chip C. The antenna A is designed to operate at a first frequency F1, for example in the range of approximately 860 MHz to 930 MHz, with the antenna A taking incident power at the first frequency F1 from an RFID reader and converting it to a voltage across the RFID chip C to allow it to operate.

A second frequency applied by the microwave oven, identified in FIG. 1 at F2, typically on the order of approximately 2,450 MHz, may also be incident on the antenna A when the RFID tag T is placed into the microwave oven. The antenna A is not designed to operate at the second frequency F2, as the very high power levels incident at second frequency F2 will generate high voltages on the antenna A. These high voltages can appear at a number of places on the antenna A; however, by methods such as introducing large gaps L between antenna elements and controlled radii (identified generally at R in FIG. 1), a voltage across said elements that would generate a high voltage breakdown and, hence, arc can be avoided. However, the gap G bridged by the RFID chip C is necessarily relatively small and, hence, a high voltage arises at the second frequency F2, which high voltage may cause a breakdown and generate an arc. Similarly depicted in FIG. 1A; the dipole antenna 17 can receive microwave energy (identified in FIG. 1A at M) and reflect the microwave energy (represented in FIG. 1A at R) into the microwave source. There is the possibility that an arc may be created between adjacent sections of the dipole antenna 17 (which location may be between the two conductive elements of the dipole antenna 17, as identified in FIG. 1A at 19). Additionally, referring to FIG. 1A the dipole antenna 17 of the conventional RFID tag 11 is formed of relatively thick, low resistance conductor, which has different properties than the metallic film used to define a typical susceptor. For example, common susceptors are made from metal-coated films with optical densities ranging from 0.18 to 0.29, corresponding to a sheet resistance of 100 ohms to 230 ohms, whereas a material of less than 1 ohm per square is commonly used to form the antenna 18 of the RFID tag 11. On account of the characteristics of the dipole antenna 17, the RFID tag 11 can cause issues if it is not dissociated from the food item prior to microwaving the food item (i.e., if the entire package 9 of FIG. 1A is placed into the microwave oven).

To avoid problems of this nature, the RFID tag T and 11 of FIGS. 1 and 1A respectively, are typically configured to be readily removable or otherwise dissociable from the food item, such as by securing it to the enclosure of the package, which may include instructions to not microwave the enclosure. However, it is possible that a user failing to take proper care could place the entire package (including the RFID tag T and 11 shown in FIGS. 1 and 1A respectively) into the microwave oven with the food item, thereby failing to dissociate the RFID tag T or 11 from the food item. Accordingly, it would be advantageous to provide an RFID tag that may be microwaved without resulting in the problems associated with microwaving a conventional RFID tag T or 11.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an RFID tag includes an antenna defining a gap and configured to operate at a first frequency. An RFID chip and an antenna electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. The shielding structure is configured to limit the voltage across the gap when the antenna is exposed to a second frequency that is greater than the first frequency.

In another aspect, packaging is provided for a microwavable food item. The packaging includes an enclosure and an RFID tag secured to the enclosure. The RFID tag includes an antenna defining a gap and configured to operate at a first frequency. An RFID chip is electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. The shielding structure is configured to limit the voltage across the gap when the antenna is exposed to a second frequency that is greater than the first frequency.

In a further aspect, an RFID tag includes an antenna defining a gap and configured to operate at a first frequency. An RFID chip is electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. A second shielding structure is electrically coupled to the antenna across the gap, underlying the RFID chip. The shielding structure is configured to limit the voltage across the gap when the antenna is exposed to a second frequency that is greater than the first frequency.

In another aspect, packaging is provided for a microwavable food item. The packaging includes an enclosure and an RFID tag secured to the enclosure. The RFID tag includes an antenna defining a gap and configured to operate at a first frequency. An RFID chip is electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. A second shielding structure is electrically coupled to the antenna across the gap, underlying the RFID chip. The shielding structure is configured to limit the voltage across the gap when the antenna is exposed to a second frequency that is greater than the first frequency.

In another aspect the antenna comprised of an antenna with a sheet resistance in the range of approximately 100 ohms to approximately 230 ohms. In another aspect, an RFID tag includes an RFID chip and an antenna electrically coupled to the RFID chip. The antenna is comprised of a conductor formed of a base material and a second material with different coefficients of thermal expansion configured to cause the antenna to fracture into multiple pieces upon being subjected to heating.

In yet another aspect, a package is provided for a microwavable food item. The package includes an enclosure, an RFID label, and a joinder material sandwiched between the RFID label and the enclosure. The RFID label includes a substrate and an RFID tag associated with the substrate. The RFID tag includes an RFID chip and an antenna electrically coupled to the RFID chip. The joinder material has a greater resistance than the antenna.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 2A:
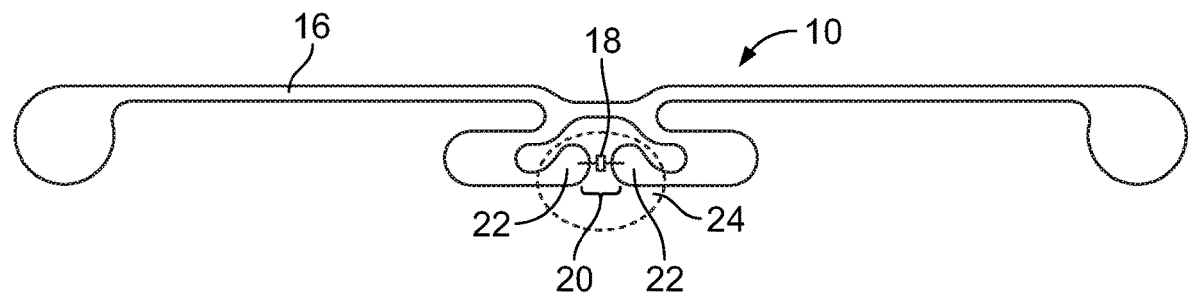
FIG. 2A is a top plan view of an RFID tag according to aspects of the present disclosure, which may be incorporated into packaging for a microwavable food item.
Figure 2B:
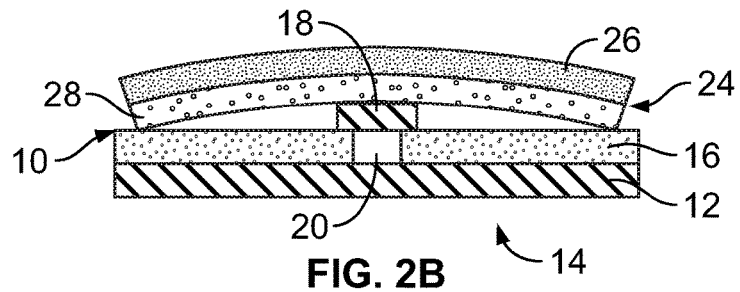
FIG. 2B is a cross-sectional side view of a portion of the RFID tag of FIG. 2A, secured to packaging for a microwavable food item.

FIGS. 2A and 2B show an RFID tag 10 according to the present disclosure, while FIG. 2B shows the RFID tag, generally designated at 10, secured to the enclosure 12 (e.g., a paper box) of packaging, generally designated at 14, for a microwavable food item. The packaging 14 may include other items, such as a "crisping sleeve" configured to be microwaved with the food item. The RFID tag 10 may be incorporated into the packaging 14 by any suitable approach and, while the RFID tag 10 is secured to the enclosure 12 in the embodiment of FIG. 2B, the RFID tag 10 may be associated with another portion of the packaging 14 (e.g., a "crisping sleeve" housed within the enclosure 12) in other embodiments. Further, while RFID tags are described herein as being incorporated into the packaging of a microwavable food item, it should be understood that RFID tags according to the present disclosure may be useful in any of a number of possible applications, particularly when it is contemplated that they may be exposed to frequencies (referred to herein as a "second frequency") that are significantly higher than the frequency (referred to herein as a "first frequency") at which an antenna of the RFID tag is intended to operate.

Figure 1:
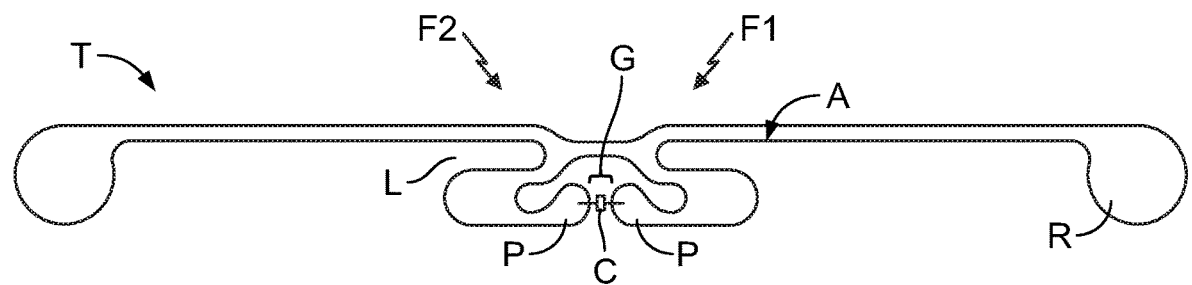
FIG. 1 is a top plan view of an RFID tag according to conventional design.

The RFID tag 10 includes an antenna 16 with an RFID chip 18 electrically coupled thereto. The antenna 16 is provided as a dipole antenna, which is formed of a conductor defining a gap 20 between two conductor pad areas 22 (FIG. 2A), which is bridged by the RFID chip 18. The antenna 16 and RFID chip 18 may be provided generally according to conventional design (e.g., as described above with respect to the embodiment of FIG. 1), with the antenna 16 being designed to operate at a first frequency, which may be in the range of approximately 860 MHz to 930 MHz. As in the conventional RFID tag T, the antenna 16 takes incident power at the first frequency and converts it to a voltage across the RFID chip 18 to allow it to operate.

The RFID chip 18 may take any of a number of forms (including those of the type commonly referred to as a "chip" or a "strap" by one of ordinary skill in the art), including any of a number of possible components and being configured to perform any of a number of possible functions. For example, in one embodiment, the RFID chip 18 includes an integrated circuit for controlling RF communication and other functions of the RFID tag 10.

The RFID tag 10 further includes a shielding structure, generally designated at 24, which is comprised of a shield conductor 26 and a shield dielectric 28. The shield conductor 26 is formed of a material having conductive properties and, as will be described in greater detail, may be variously configured without departing from the scope of the present disclosure. The shield dielectric 28 is formed of a material having dielectric properties and, as will be described in greater detail, may be variously configured without departing from the scope of the present disclosure. For example, in the embodiment of FIGS. 2A and 2B, the shield conductor 26 and shield dielectric 28 are generally flat or planar, substantially identically shaped, and oriented with the perimeter of the shield conductor 26 coinciding with the perimeter of the shield dielectric 28. In other embodiments, the shield conductor and shield dielectric may be differently configured and/or oriented at least partially out of alignment (i.e., with a portion of the shield conductor extending beyond the perimeter of the shield dielectric and/or a portion of the shield dielectric extending beyond the perimeter of the shield conductor).

The shielding structure 24 is electrically coupled to the antenna 16 across the gap 20, being coupled by capacitance to the conductor pad areas 22 on either side of the gap 20 (FIG. 2A). As shown in FIG. 2B, the shielding structure 24 overlays the RFID chip 18, with the shield dielectric 28 at least partially positioned between the RFID chip 18 and the shield conductor 26. The shielding structure 24 may overlay or cover all (as in FIGS. 2A and 2B) or only a portion of the gap 20.

As described above, it is possible for the RFID tag 10 to be exposed to signals operating at first or second frequencies. When the RFID tag 10 is exposed to the first frequency, the shielding structure 24 forms a partial short circuit across the gap 20. However, the antenna 16 is configured so as to compensate for the presence of the partial short circuit, thereby allowing the RFID tag 10 to operate properly.

As described above, when a conventional RFID tag T is exposed to the second frequency F2, a large voltage arises across the gap G, which risks the creation of an arc. If the voltage and power at the second frequency F2 are limited sufficiently, the RFID chip C may survive, but the main objective is to prevent an arc that could ignite the RFID tag T or the packaging 14 into which it is incorporated. The shielding structure 24 of FIGS. 2A and 2B provides this function by "shorting" the high voltage generated across the gap 20 (and, hence, the RFID chip 18) when the RFID tag 10 is exposed to the second frequency, thereby reducing the voltage below the level that can cause a breakdown and possible arc, which prevents ignition. Accordingly, the RFID tag 10 may be placed into a microwave and exposed to the attendant high-frequency signals (which may be on the order of approximately 2,450 MHz) without the risk of ignition, unlike a conventional RFID tag T.

Figure 3A:
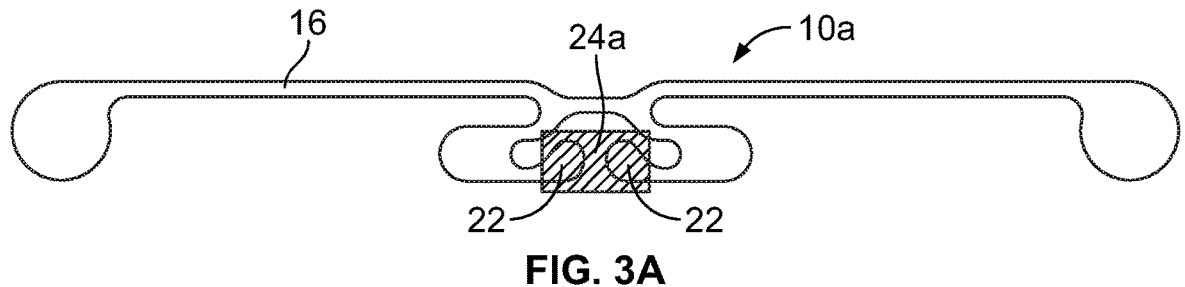
FIG. 3A is a top plan view of another embodiment of an RFID tag according to aspects of the present disclosure, which may be incorporated into packaging for a microwavable food item.
Figure 3B:
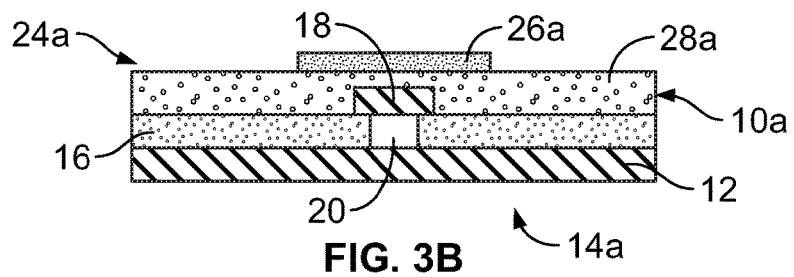
FIG. 3B is a cross-sectional side view of a portion of the RFID tag of FIG. 3A, secured to packaging for a microwavable food item.

The shielding structure may be variously configured without departing from the scope of the present disclosure, as noted above. For example, FIGS. 3A and 3B show an embodiment of an RFID tag, generally designated at 10a, (and associated packaging, generally designated at 14a, in FIG. 3B) in which the shielding structure 24a includes a differently configured shield dielectric 28a (FIG. 3B). In the embodiment of FIGS. 3A and 3B, the shield dielectric 28a is incorporated into an over-lamination layer, which overlays the RFID chip 18, at least a portion of the gap 20, and at least a portion of the conductor pad areas 22 of the antenna 16 (FIG. 3A). The shield conductor 26a may comprise a patterned conductor to provide the desired bridging and shielding effects. As best seen in FIG. 3B, the shield conductor 26a and shield dielectric 28a may be differently sized and shaped, with the shield conductor 26a being smaller than the over-lamination layer into which the shield dielectric 28a is incorporated.

Figure 4A:
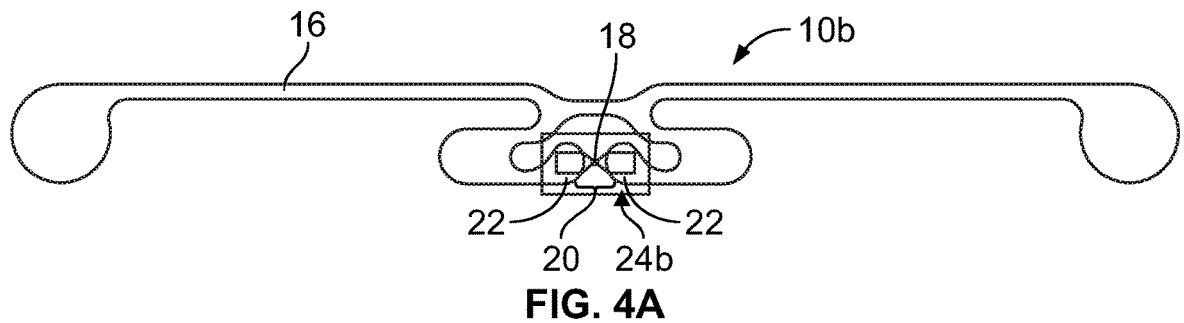
FIG. 4A is a top plan view of a third embodiment of an RFID tag according to aspects of the present disclosure, which may be incorporated into packaging for a microwavable food item.
Figure 4B:
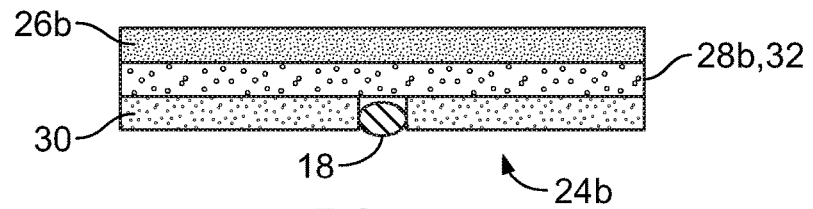
FIG. 4B is a cross-sectional side view of a portion of the RFID tag of FIG. 4A.

FIGS. 4A and 4B illustrate another embodiment of an RFID tag, generally designated at 10b, according to the present disclosure. In the embodiment of FIGS. 4A and 4B, the shielding structure, generally designated at 24b, is incorporated into an RFID strap comprised of a strap conductor 30 and strap substrate 32 (along with the RFID chip 18), which is electrically coupled to the antenna 16, across the gap 20. The shielding structure 24b may be comprised of a shield conductor 26b applied to the strap substrate 32, which serves as the shield dielectric 28b. The strap substrate 32 (and any of the other shield dielectrics described herein) may be formed of any of a variety of materials, such as polyethylene terephthalate.

Figure 5:
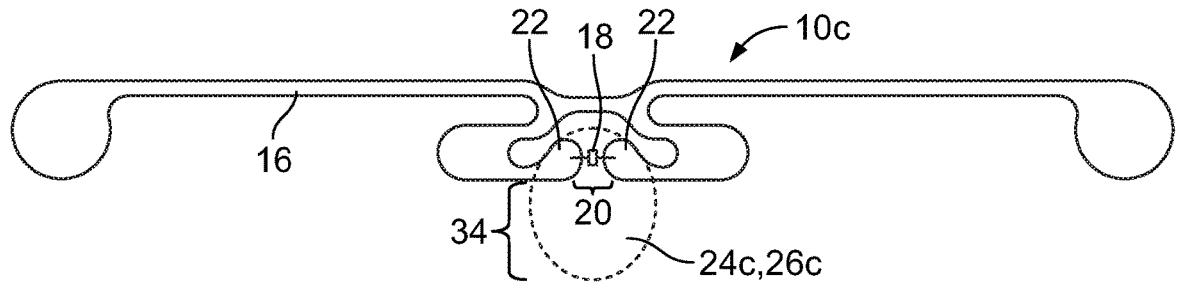
FIG. 5 is a top plan view of a fourth embodiment of an RFID tag according to aspects of the present disclosure, which may be incorporated into packaging for a microwavable food item.

FIG. 5 illustrates another embodiment of an RFID tag, generally designated at 10c, with a differently configured shielding structure 24c. In the embodiment of FIG. 5, the shield conductor 26c includes an extended area 34, which may increase the size of the shield conductor 26c beyond that of the associated shield dielectric (which is not visible in FIG. 5). In contrast to other embodiments, in which the shielding structure is primarily configured and oriented to overlay or cover the gap 20, the extended area 34 of the shield conductor 26c is oriented so as not to overlay the gap 20 (or the antenna 16), but rather is positioned laterally of the antenna 16 and the gap 20, extending away from the antenna 16. The extended area 34 of the shield conductor 26c may be variously sized and configured without departing from the scope of the present disclosure, being approximately the same size as the shield conductor 26 of FIGS. 2A and 2B in one embodiment, larger than the shield conductor 26 of FIGS. 2A and 2B in another embodiment, and smaller than the shield conductor 26 of FIGS. 2A and 2B in yet another embodiment.

Regardless of the particular size and configuration of the extended area 34 of the shield conductor 26c, the extended area 34 assists in dissipating heat generated across the gap 20. This effect is enhanced by increasing the size of the extended area 34, so it may be advantageous for the extended area 34 to be relatively large for improved heat dissipation. The extended area 34 (along with the remainder of the shield conductor 26c, as well as any of the other shield conductors described herein) may be formed of a non-flammable material, such as but not limited to, an aluminum material, heat resistant, flame resistant paper (Flex Dura HR, http://www.flexlinkllc.com/heat-resistant-paper.html), and non-flammable adhesive (Eclectic E6000 Adhesive, http://eclecticproducts.com/products/e6000.html) to provide a barrier to any arc that may be generated across the gap 20 to prevent a fire from spreading.

Figure 6A:
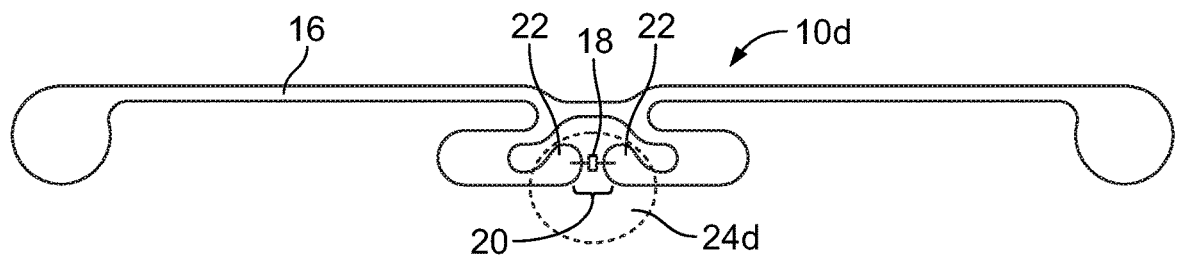
FIG. 6A is a top plan view of a fifth embodiment of an RFID tag according to aspects of the present disclosure, which may be incorporated into packaging for a microwavable food item.
Figure 6B:
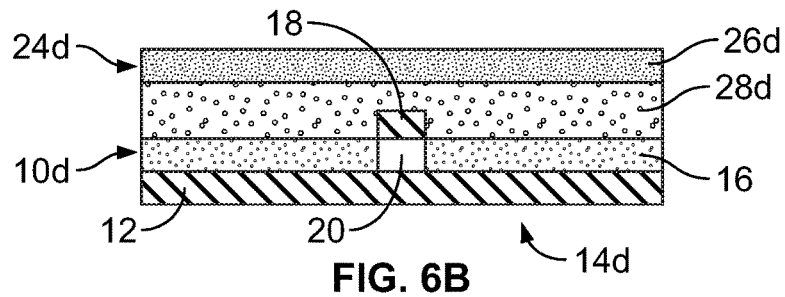
FIG. 6B is a cross-sectional side view of a portion of the RFID tag of FIG. 6A, secured to packaging for a microwavable food item.

FIGS. 6A and 6B illustrate yet another embodiment of an RFID tag, generally designated at 10d, (and associated packaging, generally designated at 14d, in FIG. 6B) with a differently configured shielding structure 24d. In the embodiment of FIGS. 6A and 6B, the shield dielectric 28d is formed of a material which undergoes reversible or non-reversible dielectric breakdown at high voltages of the type induced by a high-power microwave field. By such a configuration, the shorting effect provided by the shielding structure 24d in the presence of a second frequency (e.g., in a microwave field) may be enhanced. In this embodiment (as well as in other embodiments described herein), the shield conductor 26d may be formed by printing a conductive material (which becomes and defines the shield conductor 26d) onto the shield dielectric 28d, such as an over-lamination.

Figure 7A:
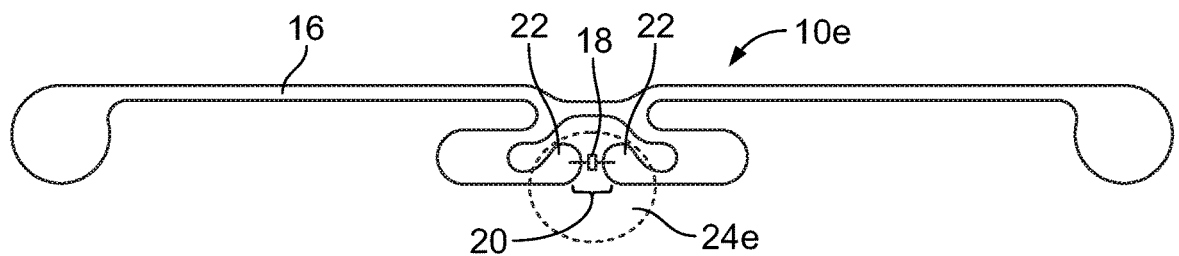
FIG. 7A is a top plan view of a sixth embodiment of an RFID tag according to aspects of the present disclosure, which may be incorporated into packaging for a microwavable food item.
Figure 7B:
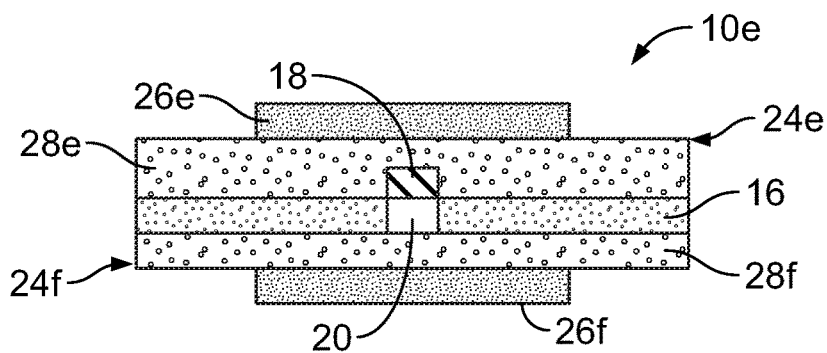
FIG. 7B is a cross-sectional side view of a portion of the RFID tag of FIG. 7A.

A single RFID tag may include more than one shielding structure, as shown in the embodiment of FIGS. 7A and 7B. In FIG. 7A, the RFID tag, generally designated at 10e, is provided with a first shielding structure, generally designated at 24e, in general accordance with the preceding description of the embodiment of FIGS. 3A and 3B. Rather than the antenna 16 of the RFID tag 10e being free for direct connection to the enclosure of packaging (as in FIG. 3B), a second shielding structure, generally designated at 24f, (FIG. 7B) is associated with an underside of the antenna 16, with the second shielding structure 24f underlying the RFID chip 18 (i.e., with the shielding structures 24e and 24f electrically coupled to opposing faces of the antenna 16). The shield dielectric 28f of the second shielding structure 24f contacts the underside of the antenna 16, while the associated shield conductor 26f is free to be secured or otherwise associated to the enclosure of a package for microwavable food or the like.

In the illustrated embodiment, the second shielding structure 24f is substantially identical to the first shielding structure 24e, but it is within the scope of the present disclosure for the shield conductor 26f and/or the shield dielectric 28f of the second shielding structure 24f to be differently configured from the shield conductor 26e and shield dielectric 28e of the first shielding structure 24e. Regardless of the particular configurations of the two shielding structures 24e and 24f, by providing them on both faces of the antenna 16, additional shielding is provided. This additional shielding involves additional "shorting," as there are now two partial short circuits across the gap 20. However, in accordance with the preceding description of the embodiment of FIGS. 2A and 2B, the antenna 16 is configured so as to compensate for the presence of the partial short circuits, thereby allowing the RFID tag 10e to operate properly when exposed to the first frequency.

Figure 8:
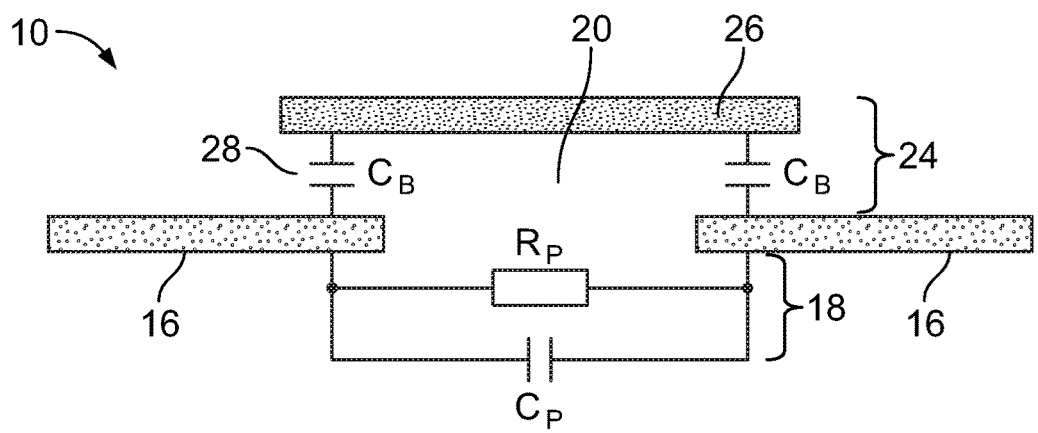
FIG. 8 illustrates a basic equivalent circuit of a portion of an RFID tag according to aspects of the present disclosure.

FIG. 8 is a basic equivalent circuit representing the basic components of an RFID tag 10 according to the present disclosure. In FIG. 8, the gap 20 defined by the antenna 16 is bridged by an RFID chip 18 (represented by a resistor Rp and a capacitor Cp) and a shielding structure 24 comprising a shield conductor 26 and a shield dielectric 28 (represented by two identical capacitors $C_B$ in series). The total capacitance of the shield dielectric 28 is half of the capacitance of the individual capacitors $C_B$ used to represent the shield dielectric 28 in FIG. 8. This is calculated using the standard formula in which the total capacitance of a series of capacitors is the inverse of the sum of all inverse capacitances.

The impedance of the shield dielectric 28 is equal to the inverse of the product of 2×π×F× total capacitance, in which F is the frequency at which the RFID tag 10 is powered. Thus, if the first frequency is on the order of approximately 800 MHz and the second frequency is on the order of approximately 2,400 MHz, then impedance drops by a factor of approximately three between the first and second frequencies, which enhances the "shorting" and, hence, shielding effect at the second frequency.

Additionally, there is the possibility that an arc may be created between adjacent sections namely gap G and associated RFID chip C. This is in part due to adjacent sections being surrounded by a material (i.e. air or other elements) having a dielectric strength lower than that of the electric field achieved by said differential voltages across said adjacent sections. Also an arc may be created and exacerbated in part due to materials surrounding said sections that reach a temperature, due to RF current flowing along/through said adjacent sections gap G and chip C, that lowers dielectric strength of the surrounding material as well as creates flammable/combustible volatiles. This arc can be avoided without the use of a shield by surrounding said sections with a material having the properties such as; a dielectric strength that can withstand the electric field at said sections, along with having heat resistant, flame resistant and non-flammable properties i.e. heat resistant and flame resistant paper and non-flammable adhesive(s).

Furthermore, within the same scope of the invention additional embodiments are disclosed. In the illustrated embodiment of FIG. 9, the enclosure 23 is associated with the RFID tag 25 includes an RFID chip 27 with an antenna 29 electrically coupled thereto. The antenna 29 is formed of a conductor 31 having a resistance that is greater than the resistance of the antenna 18 of a conventional RFID tag 11, which allows the package 21 (including the RFID tag 25) to be safely microwaved. For example, the conductor 31 may have a sheet resistance that is comparable to that of the sheet resistance of a susceptor (i.e., in the range of approximately 100 ohms to approximately 230 ohms). The conductor 31 may also have an optical density in the range of approximately 0.18 to 0.29, similar to a susceptor. By such a configuration, when the RFID tag 25 is microwaved, it acts in the way that a susceptor does when being microwaved, by absorbing microwave energy M and heating up and reflecting minimal energy R', rather than reflecting high levels of energy to the microwave source or creating an arc.

The higher sheet resistance of the conductor 31 may affect the efficiency of the antenna 29 compared to the dipole antenna 17 of a typical RFID tag 11. While the sheet resistance of the material (measured in ohms per square at a given thickness) is a fixed value, the resistance experienced by an RF current flowing through the conductor 31 may be effectively decreased by increasing the area of the conductor 31 (e.g., by increasing its thickness). This is particularly effective in reducing the resistance for an RF current, as skin depth is more of a factor than for a DC current, due to the tendency of an RF current to flow in the outer surface of the conductor 31 (i.e., as conductor thickness is reduced with respect to the skin depth, RF resistance becomes higher than DC resistance would be). Accordingly, it may be advantageous for the antenna 29 to have a relatively large area or thickness to decrease the RF resistance.

Figure 9:
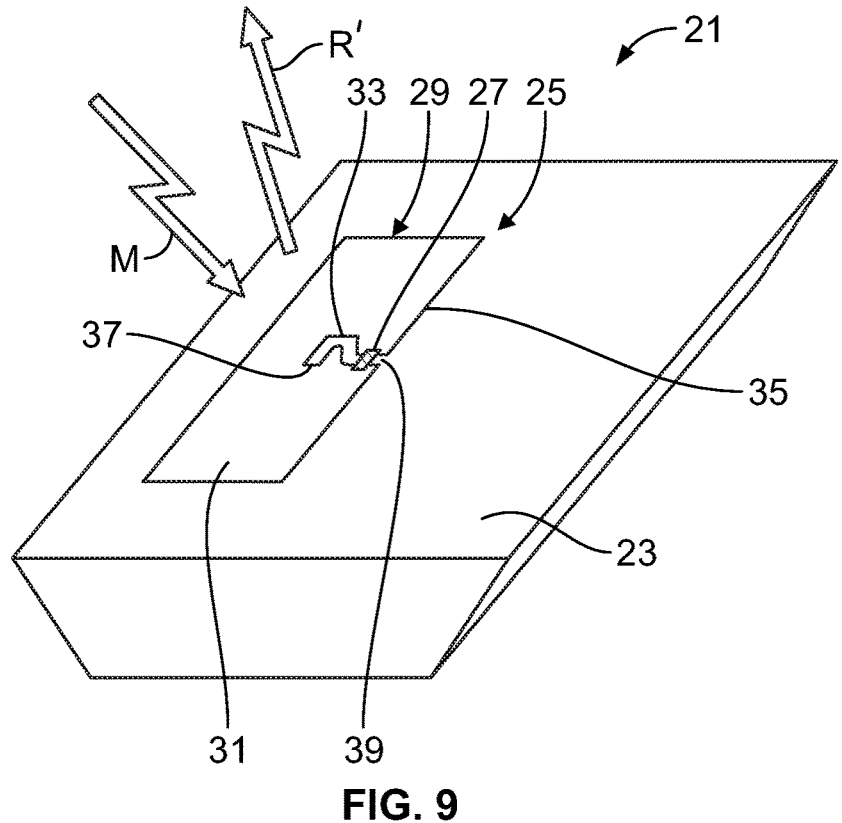
FIG. 9 is a perspective view of a package for a microwavable food item incorporating an RFID tag according to aspects of the present disclosure.

Compared to a dipole antenna, the conductor of a slot-loop hybrid antenna typically has a greater area, such that it may be advantageous for the antenna 29 to be provided as a slot-loop hybrid antenna (sometimes referred to as a "sloop" antenna), as in FIG. 9. Such a slot-loop hybrid antenna 29 may be formed of a conductor 31 comprising a conductor sheet which, in the illustrated embodiment, is generally rectangular, with a slot 33 defined therein and positioned at an edge or end 35 of the conductor sheet 31. As shown, the slot 33 may extend between a closed end 37 and an open end 39 associated with the end or edge 35 of the conductor sheet 31. While there are various advantages to the antenna 29 being configured as a slot-loop hybrid antenna, it is within the scope of the present disclosure for the antenna 29 to be variously configured.

Further observing the RFID chip 27, it may take any of a number of forms (including those of the type commonly referred to as a "chip" or a "strap" by one of ordinary skill in the art), including any of a number of possible components and configured to perform any of a number of possible functions. For example, in one embodiment, the RFID chip 27 includes an integrated circuit for controlling RF communication and other functions of the RFID tag 25. In the illustrated embodiment, two ends or points of the RFID chip 27 are connected to the conductor sheet 31 at opposite sides of the slot 33, adjacent to the open end 39 of the slot 33, which serves to electrically couple the RFID chip 27 to the conductor sheet 31.

According to another aspect of the present disclosure, which may be incorporated into the antenna 29 of the RFID tag 25 of FIG. 9 or may be separately practiced, an RFID tag 41 (FIGS. 10 and 10A) that is suitable for incorporation into a package for a microwavable food item may be configured to fracture into multiple pieces or otherwise dissociate upon being subjected to heating in a microwave oven. By fracturing, interaction with the microwave field is reduced, thereby avoiding the potential problems of excessive reflected microwave energy and/or the creation of an arc when the RFID tag 41 is heated in a microwave oven. Such a configuration allows for the resistance of the conductor 43 of the antenna 45 of the RFID tag 41 to be lower than in the embodiment of FIG. 9 (e.g., a sheet resistance of less than 100 ohms), if desired.

Figure 10:
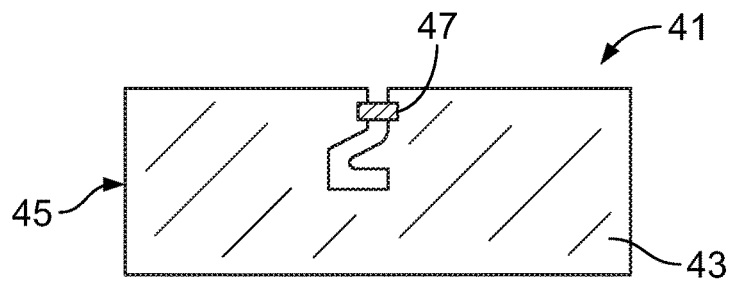
FIG. 10 is a top plan view of an alternative embodiment of an antenna of an RFID tag according to aspects of the present disclosure, which may be incorporated into a package for a microwavable food item.
Figure 10A:
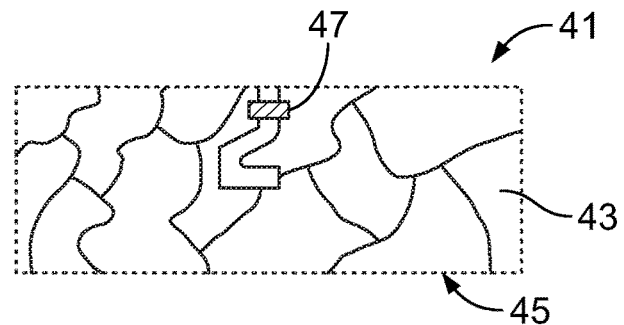
FIG. 10A is a top plan view of the antenna of FIG. 10 following heating.

The RFID tag 41 shown in FIG. 10 is provided in accordance with the foregoing description of the RFID tag 25 of FIG. 9, with an RFID chip 47 electrically coupled to the conductor sheet 43 of a slot-loop hybrid antenna 45, although the antenna 45 may be differently configured without departing from the scope of the present disclosure.

Regardless of the particular configuration of the antenna 45, its conductor sheet 43 is preferably formed of at least two materials (a base material and a secondary material, which may be provided in a lesser quantity than the base material) having different coefficients of thermal expansion. By such a configuration, the materials expand at different rates when heated (e.g., in a microwave oven) until the conductor sheet 43 fractures into multiple pieces or otherwise dissociates. The magnitude of the difference in the coefficients of thermal expansion of the materials may vary without departing from the scope of the present disclosure, although a relatively large difference may be advantageous to more quickly cause the conductor sheet 43 to fracture or otherwise dissociate upon heating.

In one exemplary embodiment, the conductor sheet 43 may be formed of a base material, such as a plastic material, and a second material, such as a metallic material or conductive ink, which have different coefficients of thermal expansion. More particularly, the base material may be polyethylene terephthalate (which has a coefficient of thermal expansion of approximately 60 m/(m K)), while the secondary material is aluminum (which has a coefficient of thermal expansion of approximately 22 m/(m K)). When bonded together and heated, the aluminum will eventually break, thus rendering the RFID tag 41 inoperative or at least causing the RFID tag 41 to operate at a lower level, which reduces the interaction between the RFID tag 41 and the microwave field. While the base material has a greater coefficient of thermal expansion than the secondary material in this example, it is within the scope of the present disclosure for the secondary material to have a greater coefficient of thermal expansion. Furthermore, in one embodiment, this breakage may be promoted by including one or more points or lines of weakness (which are evident in FIG. 10A), such as scored or thinned areas of decreased thickness, which encourages the conductor sheet 43 to break at that particular location or locations.

Figure 1A:
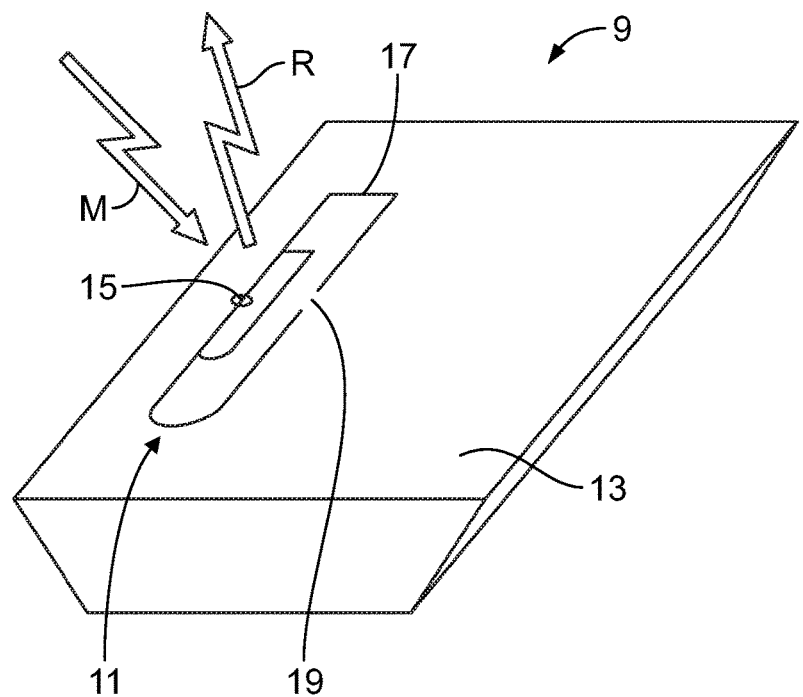
FIG. 1A is a perspective view of a package for a microwavable food item incorporating an RFID tag according to conventional design.
Figure 11:
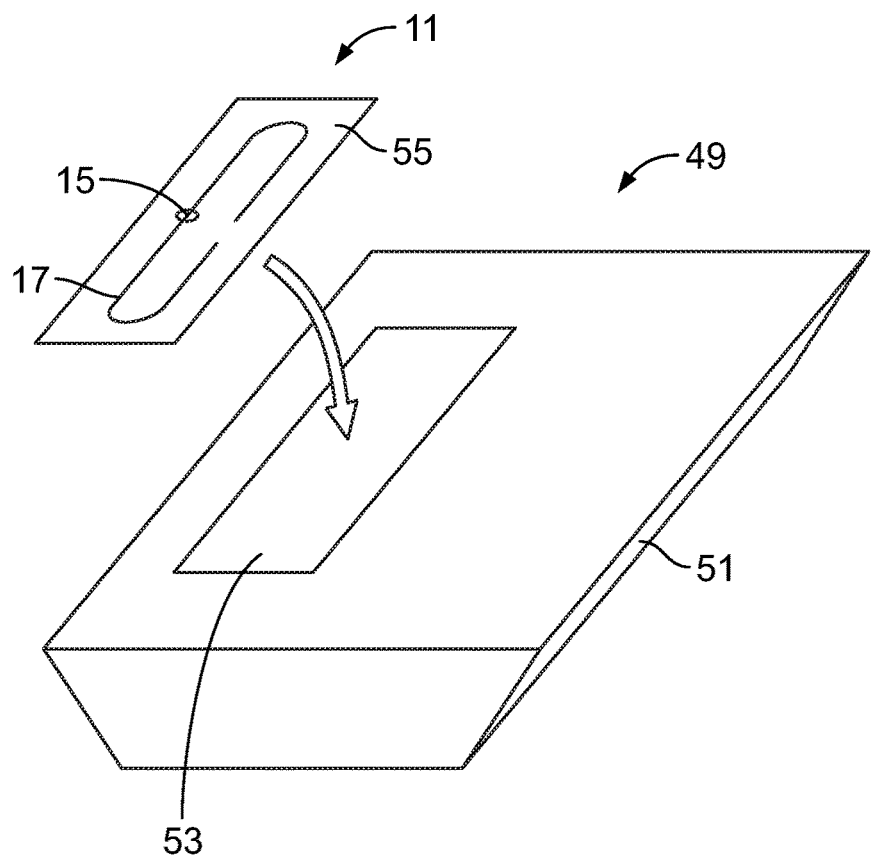
FIG. 11 is an exploded, perspective view of an alternative embodiment of a package for a microwavable food item incorporating an RFID tag according to aspects of the present disclosure.

If it is desired to employ an RFID tag 11 according to conventional design, the manner in which it is incorporated into the package 49 of a microwavable food item may be modified. FIG. 11 illustrates a package 49 incorporating an RFID tag 11 according to conventional design (as in FIG. 1A), although it is also within the scope of the present disclosure for the RFID tag 11 to be configured as in FIG. 9 or 10.

The enclosure 51 of the package 49 is provided with a joinder material 53 applied to one or more of its surfaces (illustrated in FIG. 11 as an outer surface). The joinder material 53 may be present as a relatively thin layer or sheet of material with a resistance that is higher than the resistance of the antenna 17 of the RFID tag 11 (e.g., a sheet resistance in the range of approximately 100 ohms to approximately 230 ohms). Preferably, the joinder material 53 has a substantially uniform thickness, although it is within the scope of the present disclosure for the joinder material 53 to have a non-uniform thickness. It may be advantageous for the joinder material 53 to have an average thickness that is less than the thickness of the antenna 17 of the RFID tag 15 (e.g., the joinder material 53 may have an average thickness of in the range of approximately 10 nm to approximately 100 nm for joinder material 53 comprising an aluminum material).

In one embodiment, the joinder material 53 comprises a metallic film. In another embodiment, the joinder material 53 comprises an ink of a suitable conductivity. In other embodiments, the joinder material 53 may be differently configured, provided that it has a suitably high resistance (i.e., a resistance that is at least greater than the resistance of the antenna 17 of the associated RFID tag 11 and, more preferably, a sheet resistance in the range of approximately 100 ohms to approximately 230 ohms).

In the embodiment of FIG. 11, a substrate 55 of the RFID tag 11 (to which the RFID chip 15 and antenna 17 are mounted) is associated to the enclosure 51 in a manner that sandwiches or interposes the joinder material 53 between the RFID tag 11 and the enclosure 51. The joinder material 53 itself may have adhesive qualities to cause the RFID tag 11 to be secured with respect to the enclosure 51 or a separate means may be provided to secure the RFID tag 11 to the joinder material 53 (e.g., an adhesive applied to the underside of the substrate 55). So separating the manufacturing of the enclosure 51 with the joinder material 53 and the RFID tag 11 allows for greater flexibility in manufacturing. By providing the joinder material 53 with a relatively high resistance, the effective sheet resistance of the RFID tag 11 is increased, thereby increasing the tendency to adsorb RF energy and heat up, rather than creating an arc.

The joinder material 53 may be variously configured without departing from the scope of the present disclosure. For example, the joinder material 53 may have a perimeter that substantially coincides with the perimeter of the substrate 55 of the associated RFID tag 11, a perimeter that extends beyond the entire perimeter of the substrate 55 of the associated RFID tag 11, a perimeter that is entirely contained within the perimeter of the substrate 55 of the associated RFID tag 11, or a perimeter that extends beyond the perimeter of the substrate 55 of the associated RFID tag 11 in at least one location, while being contained within the perimeter of the substrate 55 of the associated RFID tag 11 at another location. Additionally, the perimeter of the joinder material 53 may have the same shape as the perimeter of the substrate 55 of the associated RFID tag 11 or a different shape.

In another aspect of the same invention not illustrated, packaging is provided for a microwavable food item. The packaging includes an enclosure and an RFID tag secured to the enclosure. The RFID tag includes an antenna defining a gap and configured to operate at a first frequency. An RFID chip is electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. The shielding structure is configured to limit the voltage across the gap when the antenna is exposed to a second frequency that is greater than the first frequency. The enclosure of the package is provided with the joinder material 53 previously described, applied to one or more of its surfaces (similarly illustrated in FIG. 11 as an outer surface). The joinder material 53 may be present as a relatively thin layer or sheet of material with a resistance that is higher than the resistance of the antenna 17 of the RFID tag 11 (e.g., a sheet resistance in the range of approximately 100 ohms to approximately 230 ohms).

The present invention also contemplates, but is not limited to, the following testing method for the microwaveable RFID set forth herein. The equipment utilized in one method includes an inverter technology over such as a 12000 Watts Oven. For instance, a GE® Model JE 2251SJ02 can be utilized. Additionally, a scale and a plurality of plastic containers to hold samples are used. In one embodiment of the testing method, frozen, ground beef was used as a sample. The steps for the testing method using frozen ground beef are as follows: 1) A sample is prepared. A variety of weights can be utilized. In one instance, a five (5) ounce sample is used. 2) The sample is placed in one half of a container in order to ensure that the sample covers the bottom of the container consistently between different tests. 3) The sample is frozen for approximately twelve (12) hours. 4) At least one RFID label is adhered to the bottom of the container which holds the sample and the sample is placed on a rotational plate within a microwave oven. In one embodiment, the sample is placed in the center of the rotational plate within the microwave oven. 5) The sample is microwaved on a full power setting for two (2) minutes. The present testing method contemplates that several different power settings and times can be utilized in order to test the sample 6) A determination is made as to whether there was a "spark" or "arc.".

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An RFID tag comprising:
   an antenna defining a gap and configured to operate at a first frequency;
   an RFID chip electrically coupled to the antenna across the gap; and
   a shielding structure electrically coupled to the antenna across the gap, overlaying the RFID chip, and comprising
   a shield conductor, and
   a shield dielectric at least partially positioned between the shield conductor and the RFID chip, wherein the shielding structure is configured to limit the voltage across the gap when the antenna is exposed to a second frequency greater than the first frequency.

2. The RFID tag of claim 1, wherein the shield dielectric is incorporated into an over-lamination layer.

3. The RFID tag of claim 1, wherein the shielding structure is incorporated into an RFID strap.

4. The RFID tag of claim 1, wherein the shield conductor includes an extended area configured to dissipate heat generated across the gap and oriented so as not to overlie the antenna and the gap.

5. The RFID tag of claim 4, wherein the shield conductor is formed of a non-flammable material.

6. The RFID tag of claim 1, wherein the shield dielectric is formed of a material configured to undergo a reversible or non-reversible dielectric breakdown when the antenna is exposed to the second frequency.

7. The RFID tag of claim 1, wherein the shield conductor comprises a conductive material printed onto the shield dielectric.

8. The RFID tag of claim 1, further comprising a second shielding structure electrically coupled to the antenna across the gap, underlaying the RFID chip, and comprising
   a second shield conductor, and
   a second shield dielectric at least partially positioned between the second shield conductor and the antenna.

9. Packaging for a microwavable food item comprising:
   an enclosure; and
   an RFID tag secured to the enclosure and including
      an antenna defining a gap and configured to operate at a first frequency,
      an RFID chip electrically coupled to the antenna across the gap, and
      a shielding structure electrically coupled to the antenna across the gap, overlaying the RFID chip, and comprising
         a shield conductor, and
         a shield dielectric at least partially positioned between the shield conductor and the RFID chip, wherein the shielding structure is configured to limit the voltage across the gap when the antenna is exposed to a second frequency greater than the first frequency.

10. The packaging of claim 9, wherein the shield dielectric is incorporated into an over-lamination layer.

11. The packaging of claim 9, wherein the shielding structure is incorporated into an RFID strap.

12. The packaging of claim 9, wherein the shield conductor includes an extended area configured to dissipate heat generated across the gap and oriented so as not to overlie the antenna and the gap.

13. The packaging of claim 9, wherein the shield dielectric is formed of a material configured to undergo a reversible or non-reversible dielectric breakdown when the antenna is exposed to the second frequency.

14. The packaging of claim 9, further comprising a second shielding structure electrically coupled to the antenna across the gap, positioned between the antenna and the enclosure, and comprising
   a second shield conductor, and
   a second shield dielectric at least partially positioned between the second shield conductor and the antenna.

* * * * *